(12) United States Patent
Lilley et al.

(10) Patent No.: US 7,950,239 B2
(45) Date of Patent: May 31, 2011

(54) METHOD FOR OPERATING A GAS TURBINE PLANT

(75) Inventors: Darrel Lilley, Remetschwil (CH); Rolf Anders Lindvall, Wettingen (CH); Falk Ruecker, Nussbaumen (CH); Rudolf Lachner, Neuenhof (CH)

(73) Assignee: Alstom Technology Ltd., Baden (CH)

( * ) Notice: Subject to any disclaimer, the term of this patent is extended or adjusted under 35 U.S.C. 154(b) by 830 days.

(21) Appl. No.: 11/868,810

(22) Filed: Oct. 8, 2007

(65) Prior Publication Data

US 2008/0087001 A1    Apr. 17, 2008

(30) Foreign Application Priority Data

Oct. 16, 2006    (CH) .................................... 1649/06

(51) Int. Cl.
*F02C 9/00*        (2006.01)
*F02C 7/12*        (2006.01)
(52) U.S. Cl. ................. 60/774; 60/39.17; 60/39.182
(58) Field of Classification Search .............. 60/774, 60/772, 39.17, 791
See application file for complete search history.

(56) References Cited

U.S. PATENT DOCUMENTS

| | | | |
|---|---|---|---|
| 3,054,257 A | 9/1962 | Schelp | |
| 5,313,782 A * | 5/1994 | Frutschi et al. | 60/39.17 |
| 5,454,220 A | 10/1995 | Althaus et al. | |
| 5,465,569 A | 11/1995 | Althaus et al. | |
| 5,481,865 A | 1/1996 | Frutschi | |
| 5,634,327 A | 6/1997 | Kamber et al. | |
| 5,689,948 A * | 11/1997 | Frutschi | 60/39.17 |
| 6,178,738 B1 * | 1/2001 | Frutschi | 60/39.17 |
| 7,503,178 B2 * | 3/2009 | Bucker et al. | 60/39.17 |

FOREIGN PATENT DOCUMENTS

| | | |
|---|---|---|
| DE | 2648628 A1 | 5/1978 |
| EP | 0620362 A1 | 10/1994 |
| EP | 0646704 A1 | 4/1995 |
| EP | 0646705 A1 | 4/1995 |
| EP | 0718470 A2 | 6/1996 |
| WO | WO2005/064232 * | 7/2005 |

OTHER PUBLICATIONS

Dr. Dilip K. Mukherjee, "State-of-the-art gas turbines—a brief update" Gas Turbines, ABB Review, Feb. 1997, pp. 4-14.
Dr. Franz Joos et al. "Entwicklung des sequentiellen Verbrennungssystems fur die Gasturbineenfamilie GT24/GT26" Gas Turbines, ABB Technik, Apr. 1998, pp. 4-16.

* cited by examiner

*Primary Examiner* — Ted Kim
(74) *Attorney, Agent, or Firm* — Volpe and Koenig P.C.

(57) ABSTRACT

A method for operating a gas turbine plant utilizing sequential combustion is provided. The gas turbine plant includes a compressor for compressing inducted combustion air, a first combustion chamber for combustion of a first fuel by utilizing the compressed combustion air, with a first turbine which is connected downstream of the first combustion chamber, and a second combustion chamber for combustion of a second fuel by utilizing the gases which emerge from the first turbine, with a second turbine which is connected downstream of the second combustion chamber. The method provides quick running up with simultaneously low emissions and homogeneous distribution of the turbine inlet temperature is achieved by the second combustion chamber being completely shut down for achieving a low partial load mode of the gas turbine plant.

7 Claims, 3 Drawing Sheets

METHOD FOR OPERATING A GAS TURBINE PLANT

FIELD OF INVENTION

The present invention refers to the field of power generation using gas turbines.

BACKGROUND

In the technology of stationary gas turbines, as they are used in combined cycle power plants, gas turbine plants with sequential combustion are known, in which the hot gas which comes from a first combustion chamber is expanded in a first turbine, then introduced into a second combustion chamber and reheated there, and finally performs work once more in a second turbine (see, for example, documents EP-A1-0 620 362 or EP-A2-0 718 470 or the article by D. K. Mukherjee, "State-of-the-art gas turbines—a brief update", ABB review 2/1997, pp. 4-14, and F. Joos et al., "Entwicklung des sequentiellen Verbrennungssystems füar die Gasturbinenfamilie GT24/GT26" [Development of the sequential combustion system for the gas turbine family GT24/GT26], ABB Technik 4/1998, pp. 4-16). In the known gas turbines of the GT24 and GT26 types, so-called EV burners are used in the first combustion chamber, and so-called SEV burners are used in the second combustion chamber. All the aforementioned documents form an integrated component part of this application. In today's energy markets, the flexibility of operation of a power plant is of crucial importance for commercial success. Therefore, there is a great demand for flexibility and it is expected that power plants are in the position to operate between the extremes of daily requirement, start-and-stop operation and base load operation.

For this flexible use, gas turbine plants with sequential combustion which are mentioned above (for example, types GT24/GT26) have proved their worth, because they:
- have high reliability when starting up,
- can be flexibly operated in the load range between 40% and 100%,
- have high efficiency and low emissions values in partial load mode, and
- are flexible with regard to the composition of gaseous fuels and can also be selectively operated with liquid and gaseous fuels (dual fuel capability), or can also be operated with liquid and/or gaseous fuels.

However, there are times of very low demand for electrical power, in which operation at partial load compared with demand is still too high, or on account of low tariffs and high fuel costs, precisely because of this low demand, is not economical. The operator is then in the dilemma either to operate the plant at relatively higher partial load, in order to observe the limits with regard to emissions values, or to temporarily completely shut down the plant, which, during the returning to service, makes a new starting process necessary, which for many technical and economical considerations is always to be avoided per se.

SUMMARY

Therefore, it is the object of the invention to provide a method for operating a gas turbine plant with sequential combustion, by which this dilemma can be overcome without having to forego the inherent advantages of the plant with sequential combustion which is described here.

The present invention is a method for operating a gas turbine plant, including compressing inducted combustion air using at least one compressor; combusting a first fuel using the compressed combustion air in a first combustion chamber which acts downstream of the at least one compressor and driving a first turbine which acts downstream of the first combustion chamber. The method also includes, in a first state, combusting a second fuel using gases which emerge from the first turbine in a second combustion chamber which acts downstream of the first turbine and driving a second turbine which is connected downstream of the second combustion chamber. The method further includes, in a second state, shutting down completely the second combustion chamber; driving a second turbine which is connected downstream of the second combustion chamber; and achieving a low partial load mode of the gas turbine plant.

DETAILED DESCRIPTION OF THE PREFERRED EMBODIMENTS

Introduction to the Embodiments

Figure 1:
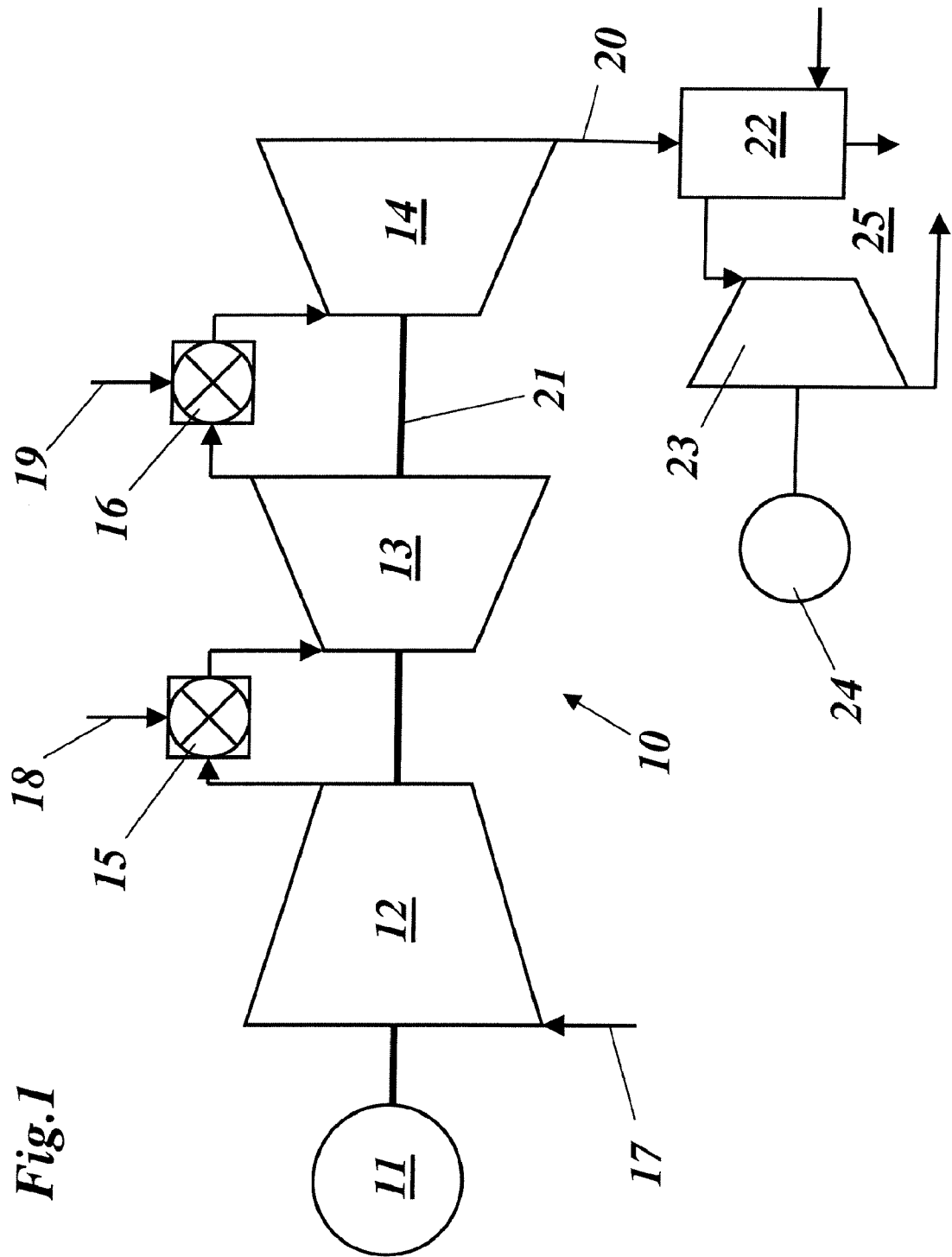
FIG. 1 shows a simplified layout of a combined cycle power plant with a gas turbine plant with sequential combustion, as is suitable for the method according to the invention.

It is essential for the invention for achieving a very low partial load mode of the gas turbine plant, the second combustion chamber, which is also referred to as a low pressure combustion chamber, is completely shut down. As a result of this, a very low partial load mode can now be achieved without the combustion in the first combustion chamber, which is also referred to as a high pressure combustion chamber, being influenced in any way with regard to emissions values and temperature distribution. In particular, it is consequently not necessary to influence the operation of the burners in the first combustion chamber, for example by these burners being shut down in groups and/or being operated with a rich fuel/air mixture.

It is, therefore, preferable to operate the first combustion chamber, during the time in which the second combustion chamber is shut down, in a lean premix mode which, furthermore, has an effect upon the outstandingly low emissions values of this plant.

In the same way, all the burners in the first combustion chamber, during the time in which the second combustion chamber is shut down, can be operated if the distribution of the burners is in annular configuration.

An essential advantage of the invention, therefore, is to be seen in the fact that the gas turbine plant in low partial load mode is operable with a relative load (RL) of less than 20%, by which those possibilities are opened up for the operator which allow an extremely flexible operation, especially the possibility is now open to the operator of never shutting down the plant and then having to start it up again later.

If the gas turbine plant is part of a combined cycle power plant with a water/steam cycle, a steam turbine, and a heat recovery steam generator which is exposed to through-flow of exhaust gases of the gas turbine plant, the combined cycle power plant is preferably operated in low partial load mode altogether with a relative load (RL) of less than 25%, which is now readily possible, and, as a result, offers the further advantage of being able to be directly reactivated during increased electrical power demand.

Advantageous and expedient developments of the object solution according to the invention are characterized in the further dependent claims.

With reference to the figures which form the drawing, exemplary embodiments of the invention are explained in detail in the following. The flow directions of the media, especially as applies to FIG. 1, are indicated by arrows.

DETAILED DESCRIPTION

In FIG. 1, a simplified layout of a combined cycle power plant with a gas turbine plant with sequential combustion is reproduced, as is suitable for the method according to the invention. It is self-evident that the invention, however, can also be applied in a gas turbine plant with sequential combustion, in which gas turbine plant is not part of a combined cycle power plant.

The combined cycle power plant of FIG. 1 comprises a gas turbine plant 10 with sequential combustion, and a water/steam cycle 25, which are interconnected via a heat recovery steam generator (HRSG) 22. The gas turbine plant (gas turbogroup) 10 comprises a compressor 12, a first combustion chamber 15 with a first turbine 13 which is connected downstream, and a second combustion chamber 16 with a second turbine 14 which is connected downstream. Compressor 12 and turbines 13, 14 are interconnected by a shaft 21. A first generator 11 for generating electric energy is driven via the shaft 21. Transmissions or couplings can also be provided in the shaft train. The actual construction of such a gas turbine plant (for example of the GT26 type) is found from the documents ABB Review 2/1997 and ABB Technik 4/1998, which are referred to above, or from the document EP 0 620 362 A1.

The compressor 12 inducts combustion air via the air inlet 17 and compresses it. The compressed air is introduced into the first combustion chamber 15 and used there for combustion of a first fuel which is injected via the first fuel feed 18. The hot combustion gases, which still contain a portion of oxygen, are expanded in the first (high pressure) turbine 13, performing work, and are then directed into the second combustion chamber 16, where the oxygen is used for combustion of a second fuel which is fed via the second fuel feed 19. The hot gases from the second combustion chamber 16 are expanded in the second turbine 14, performing work, and are then delivered via a feed line 20 to the heat recovery steam generator 22 which is connected into the water/steam cycle 25, and produces steam for a steam turbine 23. The steam turbine 23 in this example drives an additional generator 24, but can also be coupled to the generator 11. One of ordinary skill in the art would recognize the various elements of the water/steam cycle, such as condenser, feed water boiler, feed water pump, etc.

Figure 2:
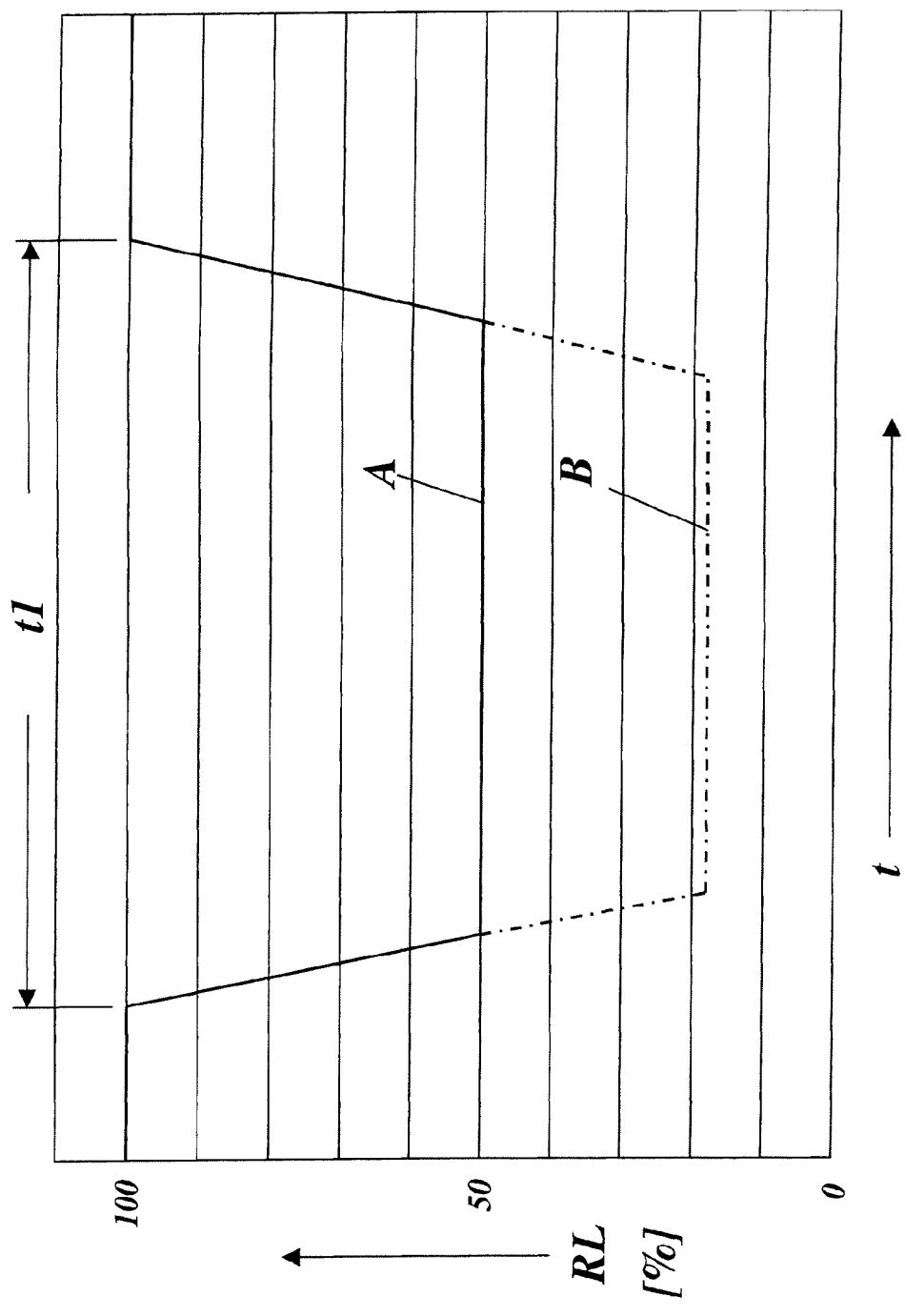
FIG. 2 shows the time variation of the relative load of a gas turbine plant with sequential combustion during a time-limited partial load mode in a conventional operating mode (continuous curve A) and according to the invention (dash-dotted curve B)

In an exemplary plant according to FIG. 1, the second combustion chamber 16 can now be completely shut down for achieving favorable thermal and emissions conditions at low partial load, i.e. the hot gases coming from the first turbine 13 flow through the second combustion chamber 16 on the way to the second turbine 14, without the second fuel being injected via the second fuel feed 19. This type of operation (with sequential combustion through the SEV burners in the second combustion chamber 16 being shut down), therefore, is exclusively limited to gas turbine plants with sequential combustion. The gas turbine plant 10 in this way can be operated at a partial load of less than 20% (see FIG. 2, curve B), observing emissions regulations, and with a homogeneous distribution of the turbine inlet temperature in lean premix mode for a time period t1 in which either the demand for power is low and/or the price for the generated electricity is lowered. The combined plant can be correspondingly operated with a very low partial load of the combined cycle of about 20-25% (see curve E in FIG. 3), wherein the water/steam cycle is maintained and can be run up at any time.

Figure 3:
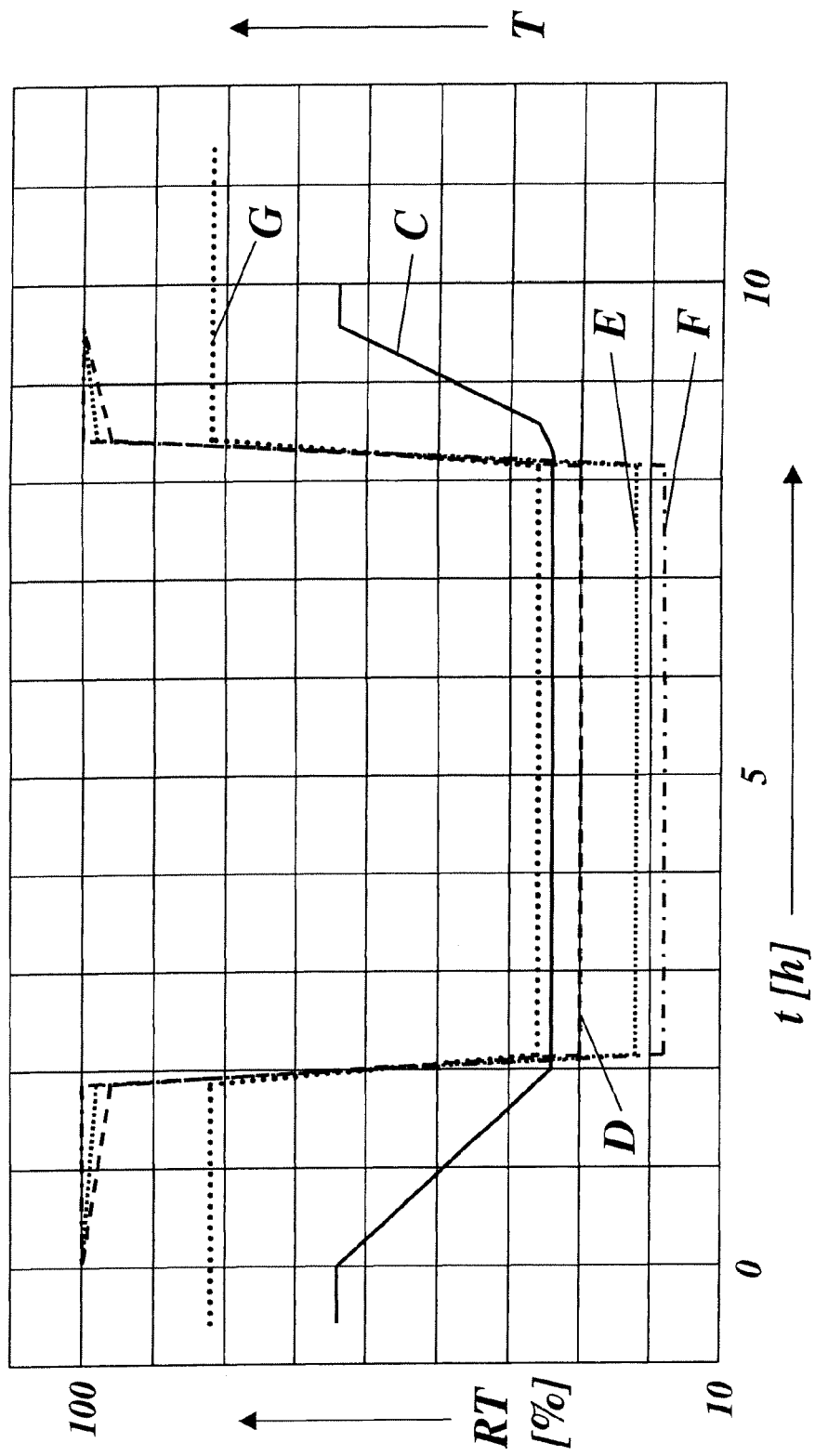
FIG. 3 shows the time variation of different operating values in a combined cycle power plant during a time-limited partial load mode according to the invention.

A simplified view of the time behavior of different parameters during such an intermediate lowering of the operation of the combined plant to a very low partial load, is shown in FIG. 3, wherein the curves G and C represent temperature curves of the outlet temperature of the gas turbine plant or of the steam temperature in the high pressure section (high pressure HP), as the case may be, and on the hot side of the reheater (hot reheat HRH) (right-hand scale), and the curves D, E and F show the relative load RL (in %) of the steam turbine or of the combined cycle or of the gas turbine plant, as the case may be, (left-hand scale). It can be seen from the representation in FIG. 3 that during the running up again of the load at the end of the lowering period, neither purging of the heat recovery steam generator, nor running up of the gas turbine and steam turbine to idling speed, nor resynchronizing are necessary, but rather that the load can be run up quickly and simply.

The operating mode according to the invention (lowering of the partial load with shutting down of the sequential combustion), has the following characteristics and advantages:

Start-stop cycles, and thus the cyclic thermal stress of the corresponding plant components, are avoided.

Maintenance costs and maintenance intervals are not negatively influenced.

A satisfactory efficiency of the plant and at the same time low fuel consumption is consequently made possible.

In low partial load mode, low emissions values, which lie close to or are even equal to those at base load, can be achieved.

A (rotating) operating reserve is made available, which is quickly and simply retrievable upon demand. The normal running up capability of the combined cycle power plant in this case is largely maintained.

The operating mode allows a quick running up of the load in order to utilize high price margins between fuel price and KWh price (so-called "spark spreads") if they occur, since no delays arise which are associated with starting as a result of plant preparation, starting of the gas turbine, purging of the heat recovery steam generator, heating up of the water/steam cycle, etc.

The potential risk of a failed start is avoided, since the plant remains in operation.

The emission of additional noise and water vapor plumes, which can occur during a starting phase, are avoided.

Compared with the previous "parking" of the plant at higher partial loads (for example 40%), the emissions are altogether significantly reduced.

A homogeneous distribution of the turbine inlet temperature in the gas turbine is ensured, which in machines without sequential combustion is not possible on account of the pilot mode or staged mode (with different burner groups) which is required there.

LIST OF REFERENCE NUMERALS

10 Gas turbine plant (with sequential combustion)
11, 24 Generator
12 Compressor 13, 14 Turbine
15, 16 Combustion chamber
17 Air inlet
18, 19 Fuel feed
20 Exhaust gas outlet
21 Shaft
22 Heat recovery steam generator
23 Steam turbine
25 Water/steam cycle
A, ..., G Curve
RT Relative load
t1 Time period

What is claimed is:
1. A method for operating a gas turbine plant, comprising,
(a) compressing inducted combustion air using at least one compressor;
(b) combusting a first fuel using the compressed combustion air in a first combustion chamber located downstream of the at least one compressor, the first combustion chamber comprises a plurality of individual burners, which are arranged in the first combustion chamber in a distributed manner;
(c) driving a first turbine located downstream of the first combustion chamber; and,
(d) in a first state:
(d1) combusting a second fuel using gases which emerge from the first turbine in a second combustion chamber located downstream of the first turbine;
(d2) driving a second turbine which is connected downstream of the second combustion chamber; and,
(e) in a second state:
(e1) completely shutting down the second combustion chamber for a time (t1);
(e2) operating all of the burners of the first combustion chamber in a lean premix mode during the time (t1);
(e3) driving the second turbine which is connected downstream of the second combustion chamber; and
(e4) achieving a low partial load mode of operation of the gas turbine plant.

2. The method as claimed in 1, further comprising selectively operating the gas turbine plant in either one of the first or second states.

3. The method as claimed in claim 1, wherein the gas turbine plant in low partial load mode is operated with a relative load (RL) of less than 20%.

4. The method as claimed in claim 3, wherein the gas turbine plant is part of a combined cycle power plant including a water/steam cycle, a steam turbine, and a heat recovery steam generator which receives a through-flow of exhaust gases of the gas turbine plant, further comprising operating the combined cycle power plant in low partial load mode with a relative load (RL) of less than 25%.

5. The method as claimed in claim 1, wherein the gas turbine plant is part of a combined cycle power plant including a water/steam cycle, a steam turbine, and a heat recovery steam generator which receives a through-flow of exhaust gases of the gas turbine plant, further comprising operating the combined cycle power plant in low partial load mode with a relative load (RL) of less than 25%.

6. The method as claimed in claim 1, wherein the gas turbine plant in low partial load mode is operated with a relative load (RL) of less than 20%.

7. The method as claimed in claim 1, wherein the gas turbine plant is part of a combined cycle power plant including a water/steam cycle, a steam turbine, and a heat recovery steam generator which receives a through-flow of exhaust gases of the gas turbine plant, further comprising operating the combined cycle power plant in low partial load mode with a relative load (RL) of less than 25%.

* * * * *